United States Patent
Huang et al.

(10) Patent No.: US 9,122,295 B2
(45) Date of Patent: Sep. 1, 2015

(54) POWER SUPPLY APPARATUS WITH REDUCING VOLTAGE OVERSHOOTING

(71) Applicant: Chicony Power Technology Co., Ltd., New Taipei (TW)

(72) Inventors: Wen-Nan Huang, New Taipei (TW); Shiu-Hui Lee, New Taipei (TW); Ching-Guo Chen, New Taipei (TW); Yao-Wen Tsai, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 6 days.

(21) Appl. No.: 13/972,330

(22) Filed: Aug. 21, 2013

(65) Prior Publication Data

US 2015/0054474 A1    Feb. 26, 2015

(51) Int. Cl.
G05F 1/00     (2006.01)
G05F 1/625    (2006.01)

(52) U.S. Cl.
CPC ..................... G05F 1/625 (2013.01)

(58) Field of Classification Search
CPC ...................................... G05F 1/625
USPC ................................ 323/282–288
See application file for complete search history.

(56) References Cited

U.S. PATENT DOCUMENTS

| | | | |
|---|---|---|---|
| 6,696,882 B1* | 2/2004 | Markowski et al. | 323/285 |
| 7,385,379 B2* | 6/2008 | Aioanei | 323/282 |
| 8,294,441 B2* | 10/2012 | Gurcan et al. | 323/280 |
| 2010/0085024 A1* | 4/2010 | Houston et al. | 323/281 |
| 2014/0266122 A1* | 9/2014 | Zhu et al. | 323/284 |

FOREIGN PATENT DOCUMENTS

| | | |
|---|---|---|
| TW | 200937155 | 9/2009 |
| TW | 201240293 | 10/2012 |
| TW | M449407 | 3/2013 |
| TW | M451735 | 4/2013 |

* cited by examiner

*Primary Examiner* — Jue Zhang
(74) *Attorney, Agent, or Firm* — Muncy, Geissler, Olds & Lowe, P.C.

(57) ABSTRACT

A voltage generating unit generates a standard output voltage and sends to a voltage output side. A voltage detection unit detects a voltage of the voltage output side and informs a voltage gain control unit. When the voltage of the voltage output side is decreasing due to a dynamic load, the voltage gain control unit is configured to control the voltage generating unit to increase a gain of a voltage generated by the voltage generating unit, and the voltage generated by the voltage generating unit is lower than the standard output voltage. Then, the voltage gain control unit is configured to control the voltage generating unit to decrease the gain of the voltage generated by the voltage generating unit, and the voltage generated by the voltage generating unit is equal to the standard output voltage.

5 Claims, 2 Drawing Sheets

POWER SUPPLY APPARATUS WITH REDUCING VOLTAGE OVERSHOOTING

BACKGROUND OF THE INVENTION

1. Field of the Invention

The present invention relates to a power supply apparatus, and especially relates to a power supply apparatus with reducing voltage overshooting.

2. Description of the Related Art

A power supply apparatus is a very common electronic device. The output voltage of the power supply apparatus is increasing until the output voltage of the power supply apparatus is equal to a standard output voltage of the power supply apparatus when the output voltage of the power supply apparatus is decreasing due to a dynamic load.

However, the output voltage of the power supply apparatus mentioned above will exceed the standard output voltage of the power supply apparatus when the output voltage of the power supply apparatus is increasing. This phenomenon is called voltage overshooting, such as the curve-A shown in FIG. 3.

The power supply apparatus and the electronic device are easily damaged due to the voltage overshooting. Therefore, reducing voltage overshooting is important for the power supply apparatus and the electronic device.

SUMMARY OF THE INVENTION

In order to solve the above-mentioned problems, an object of the present invention is to provide a power supply apparatus with reducing voltage overshooting.

In order to solve the above-mentioned problems, another object of the present invention is to provide a power supply apparatus with reducing voltage overshooting.

In order to achieve the object of the present invention mentioned above, the power supply apparatus with reducing voltage overshooting of the present invention is applied to a dynamic load. The power supply apparatus with reducing voltage overshooting includes a voltage generating unit, a voltage gain control unit, a voltage output side and a voltage detection unit. The voltage gain control unit is electrically connected to the voltage generating unit. The voltage output side is electrically connected to the voltage generating unit and the dynamic load. The voltage detection unit is electrically connected to the voltage gain control unit and the voltage output side. The voltage generating unit generates a standard output voltage and sends to the voltage output side. The voltage detection unit detects a voltage of the voltage output side and informs the voltage gain control unit. When the voltage of the voltage output side is decreasing due to the dynamic load, the voltage gain control unit is configured to control the voltage generating unit to increase a gain of a voltage generated by the voltage generating unit, and the voltage generated by the voltage generating unit is lower than the standard output voltage. Then, the voltage gain control unit is configured to control the voltage generating unit to decrease the gain of the voltage generated by the voltage generating unit, and the voltage generated by the voltage generating unit is equal to the standard output voltage.

Moreover, the voltage generating unit is, for example but not limited to, a voltage generating circuit.

Moreover, the voltage gain control unit is, for example but not limited to, a voltage gain control circuit.

Moreover, the voltage gain control unit is, for example but not limited to, a microcontroller or a microprocessor.

Moreover, the voltage detection unit is, for example but not limited to, a voltage detection circuit.

In order to achieve the other object of the present invention mentioned above, the power supply apparatus with reducing voltage overshooting of the present invention is applied to a dynamic load. The power supply apparatus with reducing voltage overshooting includes a voltage generating unit, a voltage bandwidth control unit, a voltage output side and a voltage detection unit. The voltage bandwidth control unit is electrically connected to the voltage generating unit. The voltage output side is electrically connected to the voltage generating unit and the dynamic load. The voltage detection unit is electrically connected to the voltage bandwidth control unit and the voltage output side. The voltage generating unit generates a standard output voltage and sends to the voltage output side. The voltage detection unit detects a voltage of the voltage output side and informs the voltage bandwidth control unit. When the voltage of the voltage output side is decreasing due to the dynamic load, the voltage bandwidth control unit is configured to control the voltage generating unit to decrease a bandwidth of a voltage generated by the voltage generating unit, and the voltage generated by the voltage generating unit is lower than the standard output voltage. Then, the voltage bandwidth control unit is configured to control the voltage generating unit to increase the bandwidth of the voltage generated by the voltage generating unit, and the voltage generated by the voltage generating unit is equal to the standard output voltage.

Moreover, the voltage generating unit is, for example but not limited to, a voltage generating circuit.

Moreover, the voltage bandwidth control unit is, for example but not limited to, a voltage bandwidth control circuit.

Moreover, the voltage bandwidth control unit is, for example but not limited to, a microcontroller or a microprocessor.

Moreover, the voltage detection unit is, for example but not limited to, a voltage detection circuit.

DETAILED DESCRIPTION OF THE INVENTION

Figure 1:
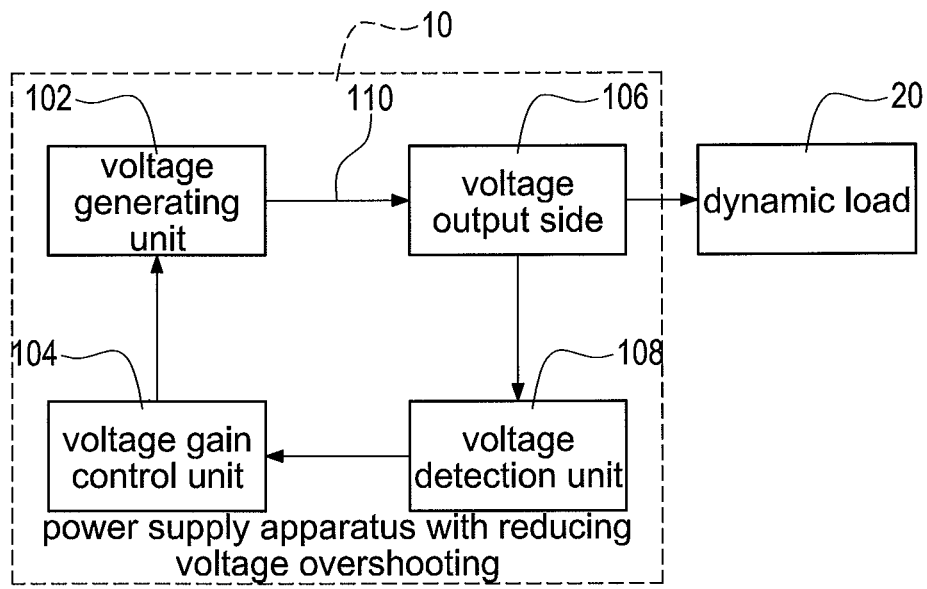
FIG. 1 shows a block diagram of the first embodiment of the power supply apparatus with reducing voltage overshooting of the present invention.

FIG. 1 shows a block diagram of the first embodiment of the power supply apparatus with reducing voltage overshooting of the present invention. A power supply apparatus 10 with reducing voltage overshooting is applied to a dynamic load 20. The power supply apparatus 10 with reducing voltage overshooting includes a voltage generating unit 102, a voltage gain control unit 104, a voltage output side 106 and a voltage detection unit 108.

The voltage gain control unit 104 is electrically connected to the voltage generating unit 102. The voltage output side 106 is electrically connected to the voltage generating unit 102 and the dynamic load 20. The voltage detection unit 108 is electrically connected to the voltage gain control unit 104 and the voltage output side 106.

The voltage generating unit 102 generates a standard output voltage 110 (for example, 12 volts) and sends to the voltage output side 106. The voltage detection unit 108 detects a voltage of the voltage output side 106 and informs the voltage gain control unit 104.

When the voltage of the voltage output side 106 is decreasing due to the dynamic load 20, the voltage gain control unit 104 is configured to control the voltage generating unit 102 to increase a gain of a voltage generated by the voltage generating unit 102, and the voltage generated by the voltage generating unit 102 is lower than the standard output voltage 110.

Then, the voltage gain control unit 104 is configured to control the voltage generating unit 102 to decrease the gain of the voltage generated by the voltage generating unit 102, and the voltage generated by the voltage generating unit 102 is equal to the standard output voltage 110.

Figure 3:
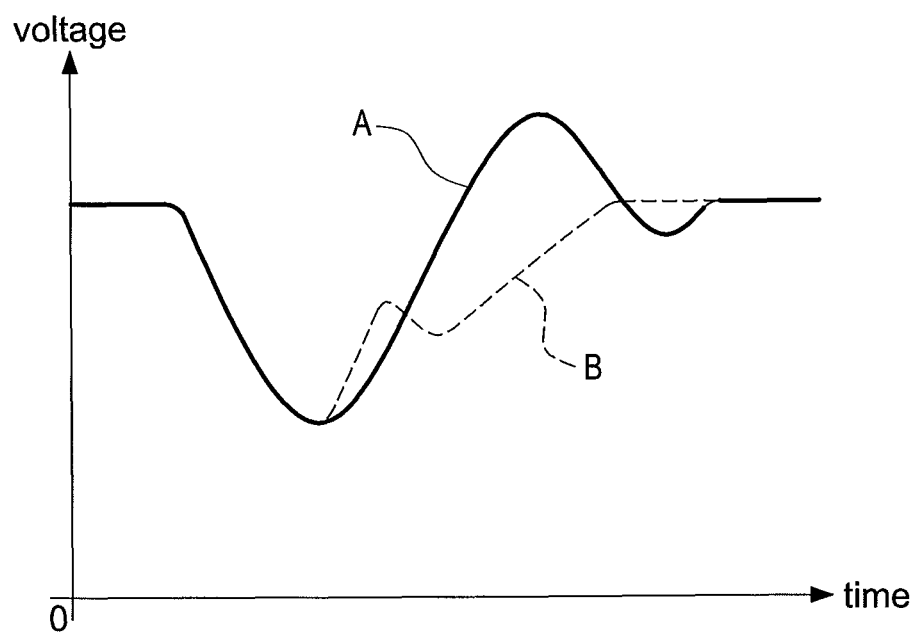
FIG. 3 shows a waveform diagram of the present invention and the related art.

FIG. 3 shows a waveform diagram of the present invention and the related art. The curve-A shows the related art. The curve-B shows the present invention.

As shown in curve-A, the output voltage of the power supply apparatus is increasing until the output voltage of the power supply apparatus is equal to a standard output voltage of the power supply apparatus when the output voltage of the power supply apparatus is decreasing due to a dynamic load. However, the output voltage of the power supply apparatus mentioned above will exceed the standard output voltage of the power supply apparatus when the output voltage of the power supply apparatus is increasing. This phenomenon is called voltage overshooting.

As shown in curve-B, the output voltage of the power supply apparatus is increasing rapidly (the gain is increasing rapidly) when the output voltage of the power supply apparatus is decreasing due to a dynamic load. Then, the output voltage of the power supply apparatus is increasing slowly (the gain is increasing slowly) until the output voltage of the power supply apparatus is equal to the standard output voltage. Therefore, the output voltage of the power supply apparatus will not exceed the standard output voltage. The voltage overshooting does not exist.

The voltage generating unit 102 is, for example but not limited to, a voltage generating circuit. The voltage gain control unit 104 is, for example but not limited to, a voltage gain control circuit, a microcontroller or a microprocessor. The voltage detection unit 108 is, for example but not limited to, a voltage detection circuit.

Figure 2:
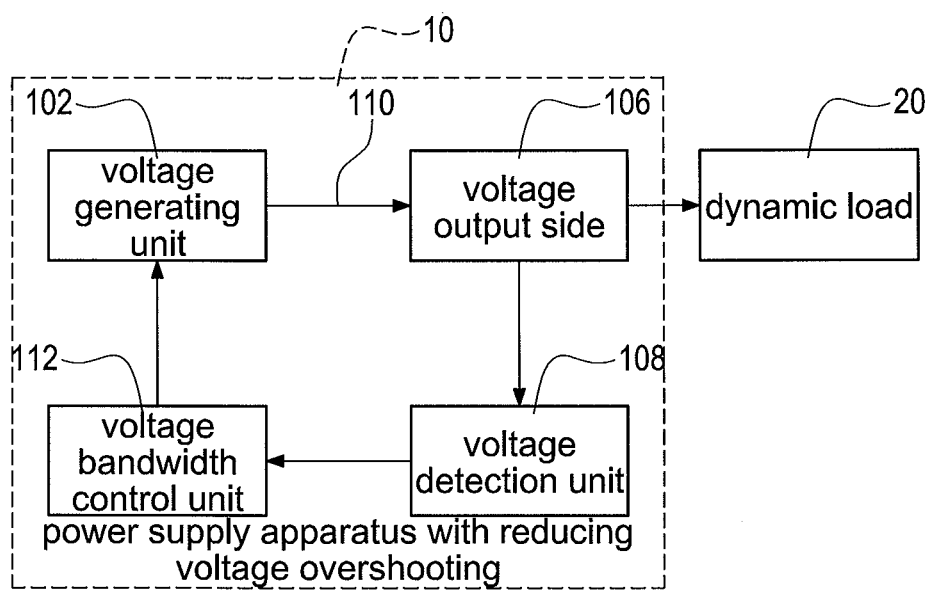
FIG. 2 shows a block diagram of the second embodiment of the power supply apparatus with reducing voltage overshooting of the present invention.

FIG. 2 shows a block diagram of the second embodiment of the power supply apparatus with reducing voltage overshooting of the present invention. A power supply apparatus 10 with reducing voltage overshooting is applied to a dynamic load 20. The power supply apparatus 10 with reducing voltage overshooting includes a voltage generating unit 102, a voltage bandwidth control unit 112, a voltage output side 106 and a voltage detection unit 108.

The voltage bandwidth control unit 112 is electrically connected to the voltage generating unit 102. The voltage output side 106 is electrically connected to the voltage generating unit 102 and the dynamic load 20. The voltage detection unit 108 is electrically connected to the voltage bandwidth control unit 112 and the voltage output side 106.

The voltage generating unit 102 generates a standard output voltage 110 (for example, 12 volts) and sends to the voltage output side 106. The voltage detection unit 108 detects a voltage of the voltage output side 106 and informs the voltage bandwidth control unit 112.

When the voltage of the voltage output side 106 is decreasing due to the dynamic load 20, the voltage bandwidth control unit 112 is configured to control the voltage generating unit 102 to decrease a bandwidth of a voltage generated by the voltage generating unit 102, and the voltage generated by the voltage generating unit 102 is lower than the standard output voltage 110.

Then, the voltage bandwidth control unit 112 is configured to control the voltage generating unit 102 to increase the bandwidth of the voltage generated by the voltage generating unit 102, and the voltage generated by the voltage generating unit 102 is equal to the standard output voltage 110.

FIG. 3 shows a waveform diagram of the present invention and the related art. The curve-A shows the related art. The curve-B shows the present invention.

As shown in curve-A, the output voltage of the power supply apparatus is increasing until the output voltage of the power supply apparatus is equal to a standard output voltage of the power supply apparatus when the output voltage of the power supply apparatus is decreasing due to a dynamic load. However, the output voltage of the power supply apparatus mentioned above will exceed the standard output voltage of the power supply apparatus when the output voltage of the power supply apparatus is increasing. This phenomenon is called the voltage overshooting.

The slope of the output voltage is steeper if the voltage bandwidth controlled by the voltage bandwidth control unit 112 is narrower. The slope of the output voltage is milder if the voltage bandwidth controlled by the voltage bandwidth control unit 112 is wider.

As shown in curve-B, the output voltage of the power supply apparatus is increasing rapidly (the bandwidth is narrower) when the output voltage of the power supply apparatus is decreasing due to a dynamic load. Then, the output voltage of the power supply apparatus is increasing slowly (the bandwidth is wider) until the output voltage of the power supply apparatus is equal to the standard output voltage. Therefore, the output voltage of the power supply apparatus will not exceed the standard output voltage. The voltage overshooting does not exist.

The voltage generating unit 102 is, for example but not limited to, a voltage generating circuit. The voltage bandwidth control unit 112 is, for example but not limited to, a voltage bandwidth control circuit, a microcontroller or a microprocessor. The voltage detection unit 108 is, for example but not limited to, a voltage detection circuit.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power supply apparatus with reducing voltage overshooting, the power supply apparatus applied to a dynamic load, and comprising:
   a voltage generating unit;
   a voltage bandwidth control unit electrically connected to the voltage generating unit;
   a voltage output side electrically connected to the voltage generating unit and the dynamic load; and
   a voltage detection unit electrically connected to the voltage bandwidth control unit and the voltage output side,
   wherein the voltage generating unit generates a standard output voltage and sends to the voltage output side; the voltage detection unit detects a voltage of the voltage output side and informs the voltage bandwidth control unit;

wherein when the voltage of the voltage output side is decreasing due to the dynamic load, the voltage bandwidth control unit is configured to control the voltage generating unit to decrease a bandwidth of a voltage generated by the voltage generating unit, so that a slope of the voltage generated by the voltage generating unit is increasing, and the voltage generated by the voltage generating unit is increasing until the voltage generated by the voltage generating unit is equal to a first voltage; the first voltage is lower than the standard output voltage;

wherein then, the voltage generating unit stops outputting the voltage, so that the voltage of the voltage output side is decreasing until the voltage of the voltage output side is equal to a second voltage; the second voltage is lower than the first voltage;

wherein then, the voltage bandwidth control unit is configured to control the voltage generating unit to increase the bandwidth of the voltage generated by the voltage generating unit, so that the slope of the voltage generated by the voltage generating unit is decreasing, and the slope of the voltage generated by the voltage generating unit is lower than the slope of the voltage generated by the voltage generating unit at a timing when the bandwidth of the voltage generated by the voltage generating unit is decreased; then the voltage generating by the voltage generating unit is increasing until the voltage generated by the voltage generating unit is equal to the standard output voltage.

2. The power supply apparatus with reducing voltage overshooting in claim 1, wherein the voltage generating unit is a voltage generating circuit.

3. The power supply apparatus with reducing voltage overshooting in claim 1, wherein the voltage bandwidth control unit is a voltage bandwidth control circuit.

4. The power supply apparatus with reducing voltage overshooting in claim 1, wherein the voltage bandwidth control unit is a microcontroller or a microprocessor.

5. The power supply apparatus with reducing voltage overshooting in claim 1, wherein the voltage detection unit is a voltage detection circuit.

* * * * *